US010975454B2

(12) United States Patent
Seo

(10) Patent No.: US 10,975,454 B2
(45) Date of Patent: *Apr. 13, 2021

(54) ULTRA-HIGH STRENGTH STEEL SHEET HAVING EXCELLENT PHOSPHATABILITY AND BENDABILITY

(71) Applicant: POSCO, Pohang-si (KR)

(72) Inventor: Seok-Jong Seo, Gwangyang-si (KR)

(73) Assignee: POSCO, Pohang-si (KR)

( * ) Notice: Subject to any disclaimer, the term of this patent is extended or adjusted under 35 U.S.C. 154(b) by 281 days.

This patent is subject to a terminal disclaimer.

(21) Appl. No.: 15/781,889

(22) PCT Filed: Dec. 7, 2016

(86) PCT No.: PCT/KR2016/014280
§ 371 (c)(1),
(2) Date: Jun. 6, 2018

(87) PCT Pub. No.: WO2017/105025
PCT Pub. Date: Jun. 22, 2017

(65) Prior Publication Data
US 2019/0003002 A1    Jan. 3, 2019

(30) Foreign Application Priority Data
Dec. 15, 2015  (KR) .................. 10-2015-0178995

(51) Int. Cl.
*C22C 38/28*    (2006.01)
*C22C 38/26*    (2006.01)
(Continued)

(52) U.S. Cl.
CPC .............. *C21D 9/46* (2013.01); *B32B 15/013* (2013.01); *B32B 15/04* (2013.01); *B32B 15/043* (2013.01); *B32B 15/18* (2013.01); *C21D 8/0236* (2013.01); *C21D 8/0247* (2013.01); *C21D 9/561* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/18* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C23C 2/02* (2013.01); *C23C 2/06* (2013.01); *C23C 2/28* (2013.01); *C23C 2/40* (2013.01); *C23C 30/00* (2013.01); *C23C 30/005* (2013.01); *C21D 6/002* (2013.01); *C21D 6/005* (2013.01); *C21D 6/008* (2013.01); *C21D 8/02* (2013.01); *C21D 8/0205* (2013.01); *C21D 8/0226* (2013.01); *C21D 8/0263* (2013.01); *C21D 8/04* (2013.01); *C21D 2211/001* (2013.01); *C21D 2211/002* (2013.01);
(Continued)

(58) Field of Classification Search
CPC ........ C21D 9/46; C21D 9/561; C21D 8/0247; C21D 8/0236; C21D 8/02; C21D 8/04; C21D 8/0205; C21D 8/0226; C21D 8/0263; C21D 6/002; C21D 6/005; C21D 6/008; C21D 2211/001; C21D 2211/002; C21D 2211/005; C21D 2211/008; C22C 38/38; C22C 38/001; C22C 38/002; C22C 38/22; C22C 38/24; C22C 38/26; C22C 38/02; C22C 38/06; C22C 38/28; C22C 38/32; C22C 38/04; C22C 38/12; C22C 38/14; C22C 38/18; C23C 2/02; C23C 2/06; C23C 2/28; C23C 2/40; C23C 30/00; C23C 30/005; B32B 15/013; B32B 15/04; B32B 15/043; B32B 15/18; Y10T 428/12799; Y10T 428/12951; Y10T 428/12972

See application file for complete search history.

(56) References Cited

U.S. PATENT DOCUMENTS

2002/0179207 A1  12/2002  Koike et al.
2009/0014095 A1   1/2009  Mukai et al.
(Continued)

FOREIGN PATENT DOCUMENTS

CN    101370954    2/2009
CN    104271787    1/2015
(Continued)

OTHER PUBLICATIONS

International Search Report—PCT/KR2016/014280 dated Mar. 16, 2017.
(Continued)

*Primary Examiner* — Michael E. La Villa
(74) *Attorney, Agent, or Firm* — Cantor Colburn LLP

(57) ABSTRACT

Provided is an ultra-high strength steel sheet having excellent phosphatability and bendability. The ultra-high strength steel sheet includes, by weight percentage (wt %), carbon (C): 0.08% to 0.2%, silicon (Si): 0.05% to 1.3%, manganese (Mn): 2.0% to 3.0%, phosphorus (P): 0.001% to 0.10%, sulfur (S): 0.010% or less, aluminum (Al): 0.01% to 0.1%, chromium (Cr): 0.3% to 1.2%, boron (B): 0.0010% to 0.0030%, titanium (Ti): 0.01% to 0.05%, nitrogen (N): 0.001% to 0.01%, a remainder of iron (Fe) and other inevitable impurities, satisfying: $3.4 \leq Ti/N \leq 10$, $1.0 \leq Mn/(Si+Cr)$, and $0.7 \leq Mn^*/(Si^*+Cr^*) \leq Mn/(Si+Cr)$, where Ti, N, Mn, Si and Cr refer to a weight percentage (wt %), and $Mn^*$, $Si^*$ and $Cr^*$ refer to an average of values obtained by GDS component analysis from a surface to a 0.1 μm position in a thickness direction.

5 Claims, No Drawings

(51) Int. Cl.

| | |
|---|---|
| *C22C 38/24* | (2006.01) |
| *C22C 38/22* | (2006.01) |
| *C22C 38/32* | (2006.01) |
| *C22C 38/06* | (2006.01) |
| *C22C 38/04* | (2006.01) |
| *C22C 38/02* | (2006.01) |
| *C22C 38/00* | (2006.01) |
| *C21D 9/46* | (2006.01) |
| *C22C 38/38* | (2006.01) |
| *C21D 9/56* | (2006.01) |
| *C21D 8/02* | (2006.01) |
| *C23C 2/40* | (2006.01) |
| *B32B 15/18* | (2006.01) |
| *C23C 30/00* | (2006.01) |
| *C23C 2/06* | (2006.01) |
| *C23C 2/28* | (2006.01) |
| *B32B 15/04* | (2006.01) |
| *C22C 38/12* | (2006.01) |
| *C22C 38/14* | (2006.01) |
| *C23C 2/02* | (2006.01) |
| *C22C 38/18* | (2006.01) |
| *B32B 15/01* | (2006.01) |
| *C21D 8/04* | (2006.01) |
| *C21D 6/00* | (2006.01) |

(52) U.S. Cl.
CPC .. *C21D 2211/005* (2013.01); *C21D 2211/008* (2013.01); *Y10T 428/12799* (2015.01); *Y10T 428/12951* (2015.01); *Y10T 428/12972* (2015.01)

(56) References Cited

U.S. PATENT DOCUMENTS

| | | | |
|---|---|---|---|
| 2015/0041024 A1 | 2/2015 | Schulz et al. | |
| 2015/0111064 A1 | 4/2015 | Ikeda et al. | |
| 2015/0299831 A1 | 10/2015 | Sato et al. | |
| 2016/0024632 A1* | 1/2016 | Uranaka | C21D 8/0478 428/659 |
| 2016/0312326 A1 | 10/2016 | Drillet et al. | |
| 2017/0037488 A1 | 2/2017 | Hasegawa et al. | |
| 2018/0355453 A1 | 12/2018 | Seo et al. | |

FOREIGN PATENT DOCUMENTS

| | | |
|---|---|---|
| JP | 06145892 | 5/1994 |
| JP | 2704350 | 1/1998 |
| JP | 3317303 | 8/2002 |
| JP | 2005248281 | 9/2005 |
| JP | 3814720 | 8/2006 |
| JP | 2013227660 | 11/2013 |
| JP | 2013253322 | 12/2013 |
| JP | 2015117403 | 6/2015 |
| JP | 2015180766 | 10/2015 |
| JP | 2017507241 | 3/2017 |
| JP | 2019502819 | 1/2019 |
| KR | 20020025065 | 4/2002 |
| KR | 20050063981 | 6/2005 |
| KR | 20120049622 | 5/2012 |
| KR | 20130106142 | 9/2013 |
| KR | 20140037180 | 3/2014 |
| WO | 2013132796 | 9/2013 |
| WO | WO 2014/157155 | * 10/2014 |

OTHER PUBLICATIONS

Chinese Office Action—Chinese Application No. 201680073190.7 dated Aug. 6, 2019, citing KR10-2012-0049622 and CN101370954.

Japanese Office Action—Japanese Application No. 2018-530850 dated Jul. 23, 2019, citing JP 2015-180766, JP 2017-507241, JP 2019-502819, JP 2015-117403, JP 06-145893, JP 2013-227660, JP 2013-253322, US 2015/0041024 and KR 10-2012-0049622.

* cited by examiner

ULTRA-HIGH STRENGTH STEEL SHEET HAVING EXCELLENT PHOSPHATABILITY AND BENDABILITY

TECHNICAL FIELD

The present disclosure relates to an ultra-high strength steel sheet used as a steel sheet for vehicles, or the like, and more particularly, to an ultra-high strength steel sheet having excellent PHOSPHATABILITY and bendability, and a method for manufacturing the same.

BACKGROUND ART

In recent years, with regard to steel sheets for automobiles, a use of an ultra-high strength steel material has increased to deal with fuel efficiency regulations for global environmental protection, and to guarantee collision safety for occupants. When manufacturing such ultra-high strength steels, it is not easy to ensure sufficient strength and ductility by using only steel materials strengthened by general solid-solution strengthening, or steel materials strengthened by precipitation strengthening.

Thus, transformation-strengthened steels having strength and ductility improved by using transformation phases have been developed, and examples thereof include dual phase (DP) steel, complex phase (CP) steel, transformation induced plasticity (TRIP) steel, and the like.

Among such transformation-strengthened steels, DP steel is a type of steel including a hard martensite phase finely uniformly distributed in a soft ferrite phase to ensure high strength and ductility. CP steel is a type of steel having two or three phases selected from ferrite, martensite, and bainite, and including precipitation strengthening elements such as titanium (Ti) or niobium (Nb) for strength improvements. TRIP steel is a type of steel having strength and ductility by processing finely and uniformly distributed retained austenite at room temperature to induce martensitic transformation.

Patent Document 1 discloses a typical technique for TRIP steel. According to the disclosed technique, a steel sheet having high formability is manufactured by adjusting an amount of retained austenite in a steel sheet. In addition, Patent Document 2 discloses a method of manufacturing a high-strength steel sheet having good press formability by adjusting an alloying composition and a microstructure of the steel sheet. Further, Patent Document 3 discloses a steel sheet including retained austenite in an amount of 5% or greater, and having high formability, particularly, high local elongation.

TRIP steels produced according to the above-mentioned techniques have an effect of improving elongation by increasing a fraction of retained austenite. However, such steels are difficult to apply to stressed sites or parts in the application field due to disadvantages thereof, such as deterioration of delayed fracture resistance. As high amounts of carbon are required to secure the fraction of retained austenite, weldability is also deteriorated.

In addition, in a case of an ultra-high strength steel sheet, it is difficult to secure sufficient elongation, despite the utilization of the transformation phase as described above, and most processing is performed through bending processing or roll forming. Therefore, it is required to suppress cracks and the like which may occur during such a processing, and in order to do so, bendability should be secured at the same time.

Bendability is excellent in ferrite single-phase steel or bainite single-phase steel having uniform material. However, it is impossible to obtain ultra-high strength steel as ferrite single-phase steel. The bainite single-phase steel should also contain carbon in a high amount to obtain ultra-high strength steel of 1 GPa or greater. Therefore, the bainite single-phase steel is hard to be practically used due to low elongation and poor weldability.

To overcome such problems, it is necessary to utilize transformation phases and precipitates at the same time to develop CP steel. However, CP steel has a problem having ductility and bendability significantly varying with fractions of phases to be configured, and proper fractions of phases and manufacturing ranges for CP steel have not yet been sufficiently studied. Thus, research and development thereof is increasingly necessary.

In addition, alloying elements such as silicon (Si), chromium (Cr), or the like, are added in large amounts to guarantee elongation and bendability. However, the addition of silicon (Si) or chromium (Cr) leads to the formation of oxides in a surface layer during an annealing process, and the formed oxides are not easily removed in a pickling process after the annealing process. Therefore, final products have poor phosphatability.

Therefore, it is necessary to develop a technique for guaranteeing phosphatability, as well as elongation and bendability.

(Patent Document 1) Japanese Patent Application Laid-open Publication No. 1994-145892
(Patent Document 2) Japanese Patent No. 2704350
(Patent Document 3) Japanese Patent No. 3317303

DISCLOSURE

Technical Problem

An aspect of the present disclosure is to provide an ultra-high strength steel sheet having high bendability and phosphatability, by optimizing a composition of alloying components and manufacturing conditions, and a method for manufacturing the same.

Technical Solution

According to an aspect of the present disclosure, an ultra-high strength steel sheet having excellent phosphatability and bendability includes, by weight, carbon (C): 0.08% to 0.2%, silicon (Si): 0.05% to 1.3%, manganese (Mn): 2.0% to 3.0%, phosphorus (P): 0.001% to 0.10%, sulfur (S): 0.010% or less, aluminum (Al): 0.01% to 0.1%, chromium (Cr): 0.3% to 1.2%, boron (B): 0.0010% to 0.0030%, titanium (Ti): 0.01% to 0.05%, nitrogen (N): 0.001% to 0.01%, a remainder of iron (Fe) and other inevitable impurities, wherein Ti and N satisfy Relationship 1,
wherein Mn, Si and Cr satisfy Relationship 2,
wherein amounts of Mn, Si and Cr in a surface layer, ranging from a surface to a 0.1 μm position in a thickness direction, satisfy Relationship 3:

$$3.4 \leq Ti/N \leq 10 \quad \text{[Relationship 1]}$$

$$1.0 \leq Mn/(Si+Cr) \quad \text{[Relationship 2]}$$

$$0.7 \leq Mn^*/(Si^*+Cr^*) \leq Mn/(Si+Cr) \quad \text{[Relationship 3]}$$

According to another aspect of the present disclosure, a method for manufacturing an ultra-high strength steel sheet having excellent phosphatability and bendability includes:

preparing a steel material satisfying the composition and Relationships of components, as described above;

hot rolling and cold-rolling the steel material to manufacture a cold-rolled steel sheet;

annealing the cold-rolled steel sheet at 770° C. to 850° C.;

rapidly cooling and maintaining the annealed cold-rolled steel sheet at a temperature within a range of Ms (martensitic transformation starting temperature) to Bs (bainitic transformation starting temperature);

cooling the annealed cold-rolled steel sheet at a rate of 10° C./min to 50° C./min, after the maintaining; and removing of the surface oxides from the cold-rolled steel sheet, after the cooling, wherein the maintaining of the cold-rolled steel sheet is performed for a period of time satisfying Relationship 5, and the removing of the surface oxides is performed under conditions satisfying Relationship 6:

$$100 \leq 4729+71C+25Mn-16Si+117Cr-20.1T+0.0199T^2 \leq 300 \quad \text{[Relationship 5]}$$

$$(\text{HCl concentration} \times \text{HCl temperature})/(1.33+Mn+7.4Si+0.8Cr) \times (47+2.1Mn+13.9Si+4.3Cr) \geq 1 \quad \text{[Relationship 6]}$$

Advantageous Effects

According to an aspect of the present disclosure, it is possible to provide an ultra-high strength steel sheet having excellent phosphatability, as well as being suitable for press forming, roll forming, and the like due to its excellent ductility and bendability, while having an ultra-high strength of 1 GPa or greater in tensile strength.

BEST MODE

The inventors have conducted in-depth research into developing an ultra-high strength steel sheet excellent in phosphatability in addition to having elongation and bendability sufficient for complicated forming, such as press forming, roll forming, or the like, and found that a steel sheet having the intended properties could be provided by optimizing a composition of alloying components and manufacturing conditions to guarantee proper factions of phases to achieve the above objectives. Based thereon, the inventors have invented the present disclosure.

Embodiments of the present disclosure will now be described in detail.

According to an aspect of the present disclosure, an ultra-high strength steel sheet having excellent phosphatability and bendability preferably includes, by weight, carbon (C): 0.08% to 0.2%, silicon (Si): 0.05% to 1.3%, manganese (Mn): 2.0% to 3.0%, phosphorus (P): 0.001% to 0.10%, sulfur (S): 0.010% or less, aluminum (Al): 0.01% to 0.1%, chromium (Cr): 0.3% to 1.2%, boron (B): 0.0010% to 0.0030%, titanium (Ti): 0.01% to 0.05%, nitrogen (N): 0.001% to 0.01%, wherein a compositional ratio of titanium (Ti) and nitrogen (N), and a compositional ratio of manganese (Mn), silicon (Si), an chromium (Cr) are properly controlled.

First, reasons for controlling compositions and Relationships of alloying components of the ultra-high strength steel sheet of the present disclosure will be described in detail. In the following description, amounts of each element are given in wt % unless otherwise specified.

Carbon (C): 0.08% to 0.2%

Carbon (C) is a key element for ensuring the strength of phase-transformation steel.

To this end, it may be preferable that the content of carbon (C) be within the range of 0.08% or greater, and when an amount of carbon (C) is less than 0.08%, it may be difficult to obtain tensile strength of 1 GPa or greater. On the other hand, when an amount of carbon (C) is greater than 0.2%, ductility and bendability decrease, thereby resulting in poor spot weldability in addition to decreases in press formability and roll forming formability.

Therefore, according to the present disclosure, it is preferable that the content of carbon (C) be within the range of 0.08% to 0.2%.

Silicon (Si): 0.05% to 1.3%

Silicon (Si) may be an element improving both the strength and elongation of steel materials, and have an effect of suppressing the formation of carbides during austempering.

To obtain these effects, it is preferable that an amount of silicon (Si) be 0.05% or greater. When an amount of silicon (Si) is greater than 1.3%, oxides may be formed in large amounts during an annealing heat treatment process, and thus it may be difficult to remove the oxides in a pickling process, thereby significantly decreasing phosphatability and causing defects. In addition, since the temperature of annealing for guaranteeing a proper fraction of dual-phase by heating is high, the burden of a heating furnace for annealing increases.

Therefore, according to the present disclosure, it is preferable that an amount of silicon (Si) be within the range of 0.05% to 1.3%.

Manganese (Mn): 2.0% to 3.0%

Manganese (Mn) may be an element having a significantly high solid-solution strengthening effect.

When an amount of manganese (Mn) is less than 2.0%, it may be difficult to guarantee an intended degree of strength in the present disclosure. On the other hand, when an amount of manganese (Mn) is greater than 3.0%, weldability may be poor, and the possibility of problems such as an increase in the load of a cold-rolling mill may be high. In addition, annealing oxides may be formed in large amounts, and thus phosphatability may be poor.

Therefore, according to the present disclosure, it is preferable that an amount of manganese (Mn) be within the range of 2.0% to 3.0%.

Phosphorus (P): 0.001% to 0.10%

Phosphorus (P) may be an element effective in strengthening steel.

When an amount of phosphorus (P) is less than 0.001%, this effect may be not obtained, and manufacturing costs may increase to adjust an amount of phosphorus (P) to be an excessively low value during steel making processes. On the other hand, when an amount of phosphorus (P) is excessively increased to be greater than 0.10%, press formability may be deteriorated, thereby making brittle of steel.

Therefore, according to the present disclosure, it is preferable that an amount of phosphorus (P) be within the range of 0.001% to 0.10%.

Sulfur (S): 0.010% or less

Sulfur (S) may be an element existing in steel as an impurity, and may lower ductility, bendability, and weldability of steel. Thus, an amount of sulfur (S) may be preferably adjusted to be as low as possible.

When an amount of sulfur (S) is greater than 0.010%, the possibility of inhibiting the properties described above may be increased. Thus, it is preferable that an amount of sulfur (S) be within the range of 0.010% or less.

Aluminum (Al): 0.01% to 0.1%

Aluminum (Al) may effectuate a deoxidizing action by combining with oxygen molecules contained in steel during steel making processes, and together with silicon (Si), facilitate distribution of carbon (C) to austenite during phase transformation.

To this end, it is preferable that an amount of aluminum (Al) be within the range of 0.01% or greater. When an amount of aluminum (Al) is greater than 0.1%, the surface quality of steel slabs may decrease, and manufacturing costs may increase.

Therefore, according to the present disclosure, it is preferable that an amount of aluminum (Al) be within the range of 0.01% to 0.1%.

Chromium (Cr): 0.3% to 1.2%

Chromium (Cr) may be an element added to improve the hardenability of steel, and guarantee high strength, and in the present disclosure, chromium (Cr) may be an element effective in inducing a formation of bainite by delaying transformation of ferrite.

When an amount of such chromium (Cr) is less than 0.3%, it may be difficult to obtain these effects. On the other hand, when an amount of chromium (Cr) is greater than 1.2%, the above effects may be saturated. In addition, load in a cold-rolling operation may increase, since strength of a hot-rolled material may be excessively high, thereby significantly increasing manufacturing costs. In addition, annealing oxides are formed during an annealing heat treatment, and thus it may be difficult to control a pickling process, thereby resulting in significantly poor phosphatability.

Therefore, according to the present disclosure, it is preferable that an amount of chromium (Cr) be within the range of 0.3% to 1.2%.

Boron (B): 0.0010% to 0.0030%

Boron (B) may be an element effective in increasing a fraction of bainite by suppressing transformation from austenite to ferrite during cooling in an annealing process.

When an amount of boron (B) is less than 0.0010%, it may be difficult to obtain the effects described above. On the other hand, when an amount of boron (B) is greater than 0.0030%, these effects may be saturated due to grain boundary segregation of boron (B), and phosphatability may be deteriorated due to concentration of boron (B) in the surface during an annealing heat treatment.

Therefore, according to the present disclosure, it is preferable that an amount of boron (B) be within the range of 0.0010% to 0.0030%.

Titanium (Ti): 0.01% to 0.05%

Titanium (Ti) may be an element added to steel for increasing strength of the steel, and scavenging nitrogen (N) from the steel.

When an amount of titanium (Ti) is less than 0.01%, it may be difficult to obtain these effects. On the other hand, when an amount of titanium (Ti) is greater than 0.05%, these effects may be saturated and process defects such as nozzle clogging, or the like, may occur during a continuous casting process.

Therefore, according to the present disclosure, it is preferable that an amount of titanium (Ti) be within the range of 0.01% to 0.05%.

Nitrogen (N): 0.001% to 0.01%

Nitrogen (N) may be representative of interstitial solid solution strengthening elements, together with carbon (C). In general, nitrogen (N) may be added from the atmosphere, and an amount of nitrogen (N) may be controlled through a degasification operation during a steel making process.

When an amount of nitrogen (N) is less than 0.001%, production costs may increase due to excessive degasification to be required. When an amount of nitrogen (N) is greater than 0.01%, high-temperature ductility may be decreased due to an excessive formation of precipitates such as AlN, TiN, or the like.

Therefore, according to the present disclosure, it is preferable that an amount of nitrogen (N) be within the range of 0.001% to 0.01%.

Meanwhile, titanium (Ti) and nitrogen (N) of the above-described alloying elements of the steel sheet of the present disclosure may satisfy a relationship of components expressed by Relationship 1 below:

$$3.4 \leq Ti/N \leq 10 \qquad \text{[Relationship 1]}$$

(In Relationship 1, each of Ti and N refers to a weight percentage of the element.)

When the ratio of Ti/N is less than 3.4, the added amount of titanium (Ti) may be insufficient compared to the amount of dissolved nitrogen (N). Therefore, remaining nitrogen (N) may form NB or the like, and thus the effect of increasing strength by adding boron (B) may be lowered, thereby causing a decrease in strength. On the other hand, when the ratio is greater than 10, costs for denitrification may increase, and the possibility of problems such as nozzle clogging may increase during a continuous casting process.

Along with this, manganese (Mn), and silicon (Si) and chromium (Cr) of the above-described alloying elements may satisfy a relationship of components expressed by Relationship 2 below, and the amounts of manganese (Mn), silicon (Si), and chromium (Cr) in a steel surface layer, ranging from a surface to a 0.1 μm position in a thickness direction, may satisfy Relationship 3 below:

$$1.0 \leq Mn/(Si+Cr) \qquad \text{[Relationship 2]}$$

$$0.7 \leq Mn^*/(Si^*+Cr^*) \leq Mn/(Si+Cr) \qquad \text{[Relationship 3]}$$

(wherein, each of Mn, Si and Cr in the Relationships 2 and 3 refers to a weight percentage of the element, and each of Mn*, Si* and Cr* in Relationship 3 refers to an average of values obtained by GDS component analysis from a surface to a 0.1 μm position in a thickness direction)

The above Relationships 2 and 3 are conditions to be controlled for guaranteeing the phosphatability of the ultra-high strength steel sheet of the present disclosure. When the value of Relationship 2 is less than 1, a very dense Si and Cr oxide layer may be formed during an annealing heat treatment process. Therefore, it may be not easy to remove the oxide layer, even though a final pickling process may be enhanced. In addition, when the oxide layer is removed under conditions of an excessively high concentration of acid and an excessively high temperature, relatively weak grain boundaries may be preferentially eroded, and thus the bendability and fatigue characteristics of the steel sheet may be significantly decreased.

In addition, when the value of Relationship 3 indicating concentrations of components in the surface of the steel sheet after a final pickling process is less than 0.7, Si or Cr oxides, or an Si-rich or Cr-rich layer having poor phosphatability may remain in a very near surface layer or grain boundaries of the steel sheet, thereby hindering the formation of phosphate crystals. On the other hand, when the value is greater than the ratio of Mn/(Si+Cr), Mn-containing oxides formed in a very near surface layer may be oxidized during initial heating in an annealing heat treatment process, and may be then partially reduced in a reducing atmosphere inside an annealing furnace, or Mn-containing oxides may be initially selectively coarsened, thereby making it difficult to properly remove the Mn-containing oxides in a final pickling process. In this case, when phosphate crystals are formed, deviations may occur, resulting in poor phosphatability.

In addition to the above-described alloying components, the ultra-high strength steel sheet of the present disclosure may further include one or more of niobium (Nb), molybdenum (Mo), carbon (C), and tungsten (W) in an amount described below.

Niobium (Nb): 0.01% to 0.05%

Niobium (Nb) may be representative of precipitation strengthening elements, and may be added to increase strength of steel and induce grain refinement.

When an amount of niobium (Nb) is less than 0.01%, it may be difficult to sufficiently obtain these effects. On the other hand, when an amount of niobium (Nb) is greater than 0.05%, manufacturing costs may excessively increase, and ductility may significantly decrease due to excessive formation of precipitates.

Therefore, according to the present disclosure, it is preferable that an amount of niobium (Nb) be within the range of 0.01% to 0.05%.

Each of molybdenum (Mo), vanadium (V), and tungsten (W): 0.01% to 0.20%

Molybdenum (Mo), vanadium (V), and tungsten (W) may be elements having a function similar to that of niobium (Nb). When an amount of each of these elements is less than 0.01%, it may be difficult to have sufficient strength increasing and grain refinement effects on steel. Further, when an amount of each of these elements is greater than 0.20%, manufacturing costs may increase excessively, as compared to the effect of increasing strength.

Therefore, according to the present disclosure, when molybdenum (Mo), vanadium (V), or tungsten (W) is added, an amount of each of the elements is preferably within the range of 0.01% to 0.20%.

In addition, niobium (Nb), molybdenum (Mo), vanadium (V), and tungsten (W) may satisfy Relationship 4 below:

$$0.01 \leq Nb+0.2(Mo+V+W) \leq 0.05 \quad \text{[Relationship 4]}$$

(In Relationship 4, each of Nb, Mo, V, and W refers to a weight percentage of the element.)

When the relational value of Nb, Mo, V, and W is less than 0.01, it may be difficult to obtain grain refinement and precipitation strengthening effects. Further, when a relational value is greater than 0.05, production costs may excessively increase compared to the above-described effects.

The other component of the ultra-high strength steel sheet of the present disclosure may be iron (Fe). Since impurities from raw materials or steel manufacturing environments may be inevitably included in the ultra-high strength steel sheet, such impurities may not be excluded from the ultra-high strength steel sheet. Such impurities are well-known to those of ordinary skill in the steel manufacturing industry, and thus descriptions thereof will not be provided in the present disclosure.

The ultra-high strength steel sheet of the present disclosure may have a microstructure including, by area fraction, bainite of 30% to 80%, martensite of 20% to 50%, retained austenite of less than 5%, and a remainder of ferrite.

In this case, when a fraction of bainite is less than 30%, bendability may be decreased. On the other hand, when a fraction of bainite is greater than 80%, it may be difficult to obtain intended ultra-high strength within the range of 1 GPa or greater in tensile strength.

In addition, when a fraction of martensite is less than 20%, it may be difficult to secure ultra-high strength. On the other hand, when a fraction of martensite exceeds 50%, the strength may be secured, but the ductility and bendability may be deteriorated.

On the other hand, when a fraction of the retained austenite in the microstructure exceeds 5%, there may be a problem that the delayed fracture resistance characteristics may be deteriorated. Therefore, it is preferable to limit the fraction to 5% or less.

Although a fraction of the ferrite is not particularly limited, it is preferable to contain ferrite in a fraction of 5% to 35% to secure ductility and bendability in addition to strength. In this case, the bainite may be included in an amount of 75% as a maximum.

The ultra-high strength steel sheet of the present disclosure having the microstructure described above may have a tensile strength of 1 GPa or greater, and good ductility and bendability at the same time, by securing (tensile strength (MPa)×elongation (%))/(R/t) value of 5500 (MPa %) or greater.

When the above-mentioned value is less than 5,500, bendability may be excellent. However, In this case, since the ductility is low, press forming is impossible. Alternatively, ductility is excellent, but there is a problem that bendability may be deteriorated such that a bending crack may occur in roll forming or foam forming.

(R/t) indicates the bendability, which is a value obtained by dividing the minimum radius of curvature R in which cracking does not occur after V-bending the steel sheet by the steel sheet thickness t (mm).

The ultra-high strength steel sheet of the present disclosure, which has excellent ductility and bendability as described above, may have the advantages of both press forming and roll forming.

The ultra-high strength steel sheet of the present disclosure may be a cold rolled steel sheet or a hot-dip galvanized steel sheet.

Hereinafter, a method for manufacturing an ultra-high strength steel sheet having excellent phosphatability and bendability will be described in detail according to the present disclosure.

First, a steel material having the above-described alloying composition and component relationship may be prepared, and a hot-rolling process and a cold-rolling process may be performed on the steel material to manufacture a cold-rolled steel sheet.

In this case, the hot rolling process and the cold-rolling process may be performed according to methods generally used to manufacture an ultra-high strength steel sheet. For example, hot-rolling and cold-rolling conditions for a complex phase (CP) steel manufacturing method may be used. However, this may be a non-limiting example.

The cold-rolled steel sheet manufactured as described above may be annealed preferably at 770° C. to 850° C.

When the temperature of the annealing heat treatment is less than 770° C., a fraction of ferrite phase may exceed 40%, and thus it may be difficult to guarantee intended ultra-high strength, and bendability may be decreased. On the other hand, when the temperature of the annealing heat treatment is greater than 850° C., although bendability may be improved, surface oxides or concentrated substances from elements such as silicon (Si), manganese (Mn), chromium (Cr), or boron (B) may be formed in large amounts during the high-temperature annealing heat treatment, and remain on surface regions even after a subsequent pickling process, thereby resulting in poor phosphatability.

The annealing heat treatment may be performed in an annealing furnace under reducing atmosphere conditions provided by hydrogen and nitrogen gases, and in this case, the atmosphere of the annealing furnace may be adjusted to have a dew point within the range of −35° C. to −50° C. When the dew point may be higher than −35° C., elements having a high oxygen affinity such as manganese (Mn), silicon (Si), chromium (Cr), or boron (B) included in steel may easily form surface oxides or concentrated substances, may not be easily removed in a later pickling process, and, thus, is likely that the elements will remain. In addition, such elements may be attached to rolls of the annealing furnace, and cause dent defects. On the other hand, when the dew point is lower than −50° C., manufacturing costs may significantly increase.

The cold-rolled steel sheet annealed as described above may be rapidly cooled to a temperature within a predetermined cooling stop temperature range, and may be maintained at the temperature.

In this case, the cooling stop temperature may preferably range from Ms (martensitic transformation starting temperature) to Bs (bainitic transformation start temperature), and the cold-rolled steel sheet may be maintained within the cooling stop temperature for a predetermined period of time. The cold-rolled steel sheet may be maintained for a period of time expressed by Relationship 5 below:

$$100 \leq 4729+71C+25Mn-16Si+117Cr-20.1T+0.0199T^2 \leq 300 \quad \text{[Relationship 5]}$$

(In Relationship 5, each of Mn, Si, Cr, and C refers to a weight percentage of the element, T refers to the rapid cooling stop temperature (° C.), and the value of the expression in Relationship 5 may be in seconds.)

Relationship 5 expresses a bainitic transformation time (in seconds) according to alloying compositions and rapid cooling temperatures. When the value of Relationship 5 is less than 100 seconds, bainite may be formed in a fraction of greater than 80%. In this case, a fraction of martensite relatively reduces, and thus it may be difficult to guarantee ultra-high strength equal to or greater than 1 GPa in tensile strength. On the other hand, when the value of Relationship 5 is greater than 300 seconds, initiation of bainitic transformation may be excessively delayed. In this case, a fraction of bainite may not be 30% or greater, and thus bendability may be deteriorated.

Preferably, the rapid cooling may be performed at a rate of 100° C./min to 600° C./min. When the rapid cooling rate is less than 100° C./min, fractions of ferrite and pearlite in the microstructure may increase, and thus ultra-high strength and bendability intended in the present disclosure may not be guaranteed. On the other hand, when the rapid cooling rate is greater than 600° C./min, ductility may decrease due to excessive formation of hard phases, and problems such as shape defects, or the like, may occur.

Therefore, after the rapid cooling and the maintaining, cooling may be performed at a relatively low cooling rate (slow cooling). In this case, this cooling may preferably be performed at a rate of 10° C./min to 50° C./min. When the cooling rate is less than 10° C./min, martensite may not be formed in a proper fraction, and thus intended ultra-high strength may not be guaranteed. On the other hand, when the cooling rate is greater than 50° C./min, bainite may not be secured in a fraction of 30% or greater. Therefore, bendability may be decreased.

In the present disclosure, after the slow cooling is completed, the steel sheet may be subjected to a post-pickling process to remove annealing oxides from a surface layer of the steel sheet.

The post-pickling process may include pickling in a heated hydrochloric acid solution bath, water washing, and drying.

In more detail, according to the present disclosure, the temperature of an acid may be controlled in addition to the concentration of the acid. Specifically, although the concentration of hydrochloric acid may be adjusted according to the alloying composition of the steel sheet, the concentration of hydrochloric acid may preferably be adjusted to be within the range of 5% to 20%. When the concentration of hydrochloric acid is less than 5%, oxides may not be properly removed. On the other hand, when the concentration of hydrochloric acid is greater than 20%, erosion may rapidly occur by the acid, and selective grain boundary erosion may significantly occur, thereby resulting in poor bendability and fatigue characteristics. Although the temperature of hydrochloric acid may also be adjusted according to the alloying composition of the steel sheet, the temperature of hydrochloric acid may preferably be adjusted to be within the range of 50° C. to 80° C. When the temperature of hydrochloric acid is less than 50° C., oxides may not be easily removed due to low reactivity, and when the temperature of hydrochloric acid is greater than 80° C., the possibility of occurring selective erosion may increase due to excessively rapid reactions.

In addition, when the post-pickling process is performed under the above-described conditions, the concentration and temperature of hydrochloric acid may have a Relationship with alloying compositions as expressed by Relationship 6.

$$(\text{HCl concentration} \times \text{HCl temperature})/(1.33+Mn+7.4Si+0.8Cr) \times (47+2.1Mn+13.9Si+4.3Cr) \geq 1 \quad \text{[Relationship 6]}$$

(In Relationship 6, each of Mn, Si, Cr, and C refers to a weight percentage of the element.)

When the value of Relationship 6 is less than 1, pickling properties may deteriorate, and thus annealing oxides may not be properly removed at given concentration and temperature of hydrochloric acid. For example, when the value of Relationship 6 is 1 or greater, surface oxides may easily removed from a surface layer of the steel sheet.

In addition, the post-pickling process may preferably be performed for 5 seconds to 15 seconds. When the pickling time is less than 5 seconds, the post-pickling process may not be completely performed. On the other hand, when the pickling time is greater than 15 seconds, productivity may be lowered.

After the process of removing surface oxides is completed as described above, amounts of manganese (Mn), silicon (Si), and chromium (Cr) in a surface layer, ranging from a surface to a 0.1 μm position in a thickness direction, of the ultra-high strength steel sheet of the present disclosure satisfies Relationship 3 described above, thereby guaranteeing excellent phosphatability.

MODE FOR INVENTION

Hereinafter, the present disclosure will be described more specifically through examples. However, the following examples should be considered in a descriptive sense only and not for purposes of limitation. The scope of the present disclosure may be defined by the appended claims, and modifications and variations may be reasonably made therefrom.

Examples

A hot rolling process and a cold-rolling process were performed on steel slabs having alloying compositions shown in Table 1 below under the conventional process conditions to manufacture cold-rolled steel sheets; and an annealing process, a cooling process, and a post-pickling process were performed on the cold-rolled steel sheets under conditions shown in Table 2 below.

Thereafter, phosphate processability (phosphatability) of the cold-rolled steel sheets was analyzed, and surface GDS analysis was performed on the cold-rolled steel sheets. Results thereof are shown in Table 3 below.

In this case, the GSD analysis was performed by measuring amounts of elements in a region ranging from a surface to a 0.1 μm depth position of each of cold-rolled steel sheets, and calculating the averages of the measured values.

In addition, the phosphatability was evaluated using a phosphate solution prepared using four chemicals: Chemfos #740A, Chemfos #740R, Chemfil Buffer, and an accelerator together with Rinse Conditioner (surface modifier) and CHEMKLEEN #177 (degreaser) available from Pittsburgh Plate Glass (PPG). Phosphatability was evaluated as being acceptable or not acceptable by observing a surface enlarged 1000 times using an SEM, checking a portion not coated with phosphate, and determining whether a measured weight of phosphate coating was within the range of 2 g/m$^2$ to 3 g/m$^2$.

In addition, microstructure fractions and mechanical properties (yield strength, tensile strength, elongation, and bendability (R/t)) of each of cold-rolled steel sheets were measured, and results of the measurement are shown in Table 4 below.

In this case, an SEM image of the microstructure of each of cold-rolled steel sheets was captured at a magnification of 3000 times, and an area fraction of each phase was measured using an image analyzer. In addition, the fraction of retained austenite was measured based on the peak intensity of austenite using an XRD.

A tension test was performed using JIS-5 specimens at a rate of 10 mm/min.

In addition, for bendability, the specimen was taken in the direction perpendicular to the rolling direction. Then, the 90 degree bending test was evaluated on a mold having various R values, and the presence or absence of microcracks was visually observed.

TABLE 1

| Steel | Alloying Composition (wt %) | | | | | | | | | | | | | | ***R1 | R2 |
|---|---|---|---|---|---|---|---|---|---|---|---|---|---|---|---|---|
| | C | Si | Mn | P | S | Al | Cr | B* | Ti | N* | Nb | Mo | V | W | | |
| *IS1 | 0.13 | 0.1 | 2.6 | 0.012 | 0.003 | 0.033 | 0.7 | 18 | 0.02 | 55 | 0.025 | 0 | 0 | 0 | 3.6 | 3.25 |
| IS2 | 0.13 | 1.0 | 2.3 | 0.01 | 0.001 | 0.032 | 1.0 | 18 | 0.02 | 47 | 0.015 | 0 | 0 | 0 | 4.3 | 1.15 |
| IS3 | 0.10 | 0.5 | 2.3 | 0.011 | 0.002 | 0.035 | 0.7 | 16 | 0.02 | 45 | 0.035 | 0 | 0 | 0 | 4.4 | 1.92 |
| IS4 | 0.10 | 0.1 | 2.7 | 0.01 | 0.002 | 0.029 | 0.7 | 19 | 0.025 | 33 | 0.025 | 0 | 0 | 0 | 7.6 | 3.38 |
| IS5 | 0.10 | 1.0 | 2.4 | 0.01 | 0.002 | 0.028 | 1.0 | 25 | 0.02 | 47 | 0.025 | 0 | 0 | 0 | 4.3 | 1.20 |
| IS6 | 0.17 | 0.2 | 2.6 | 0.01 | 0.001 | 0.030 | 0.6 | 20 | 0.025 | 37 | 0.020 | 0 | 0 | 0 | 6.8 | 3.25 |
| IS7 | 0.18 | 0.8 | 2.2 | 0.01 | 0.002 | 0.040 | 0.9 | 22 | 0.03 | 39 | 0.030 | 0 | 0 | 0 | 7.7 | 1.29 |
| IS8 | 0.14 | 0.6 | 2.9 | 0.02 | 0.002 | 0.040 | 0.4 | 15 | 0.02 | 44 | 0.025 | 0 | 0 | 0 | 4.5 | 2.90 |
| IS9 | 0.14 | 0.2 | 2.1 | 0.02 | 0.002 | 0.045 | 1.1 | 22 | 0.015 | 31 | 0.015 | 0 | 0 | 0 | 4.8 | 1.62 |
| IS10 | 0.14 | 1.0 | 2.8 | 0.01 | 0.002 | 0.040 | 0.5 | 26 | 0.02 | 49 | 0.020 | 0 | 0 | 0 | 4.1 | 1.87 |
| IS11 | 0.14 | 0.5 | 2.5 | 0.01 | 0.002 | 0.035 | 0.7 | 19 | 0.025 | 36 | 0 | 0.05 | 0.1 | 0.05 | 6.9 | 2.08 |
| **CS1 | 0.07 | 1.0 | 2.3 | 0.01 | 0.001 | 0.038 | 1.0 | 22 | 0.02 | 31 | 0.020 | 0 | 0 | 0 | 6.5 | 1.15 |
| CS2 | 0.12 | 0.3 | 1.8 | 0.01 | 0.001 | 0.025 | 0.4 | 16 | 0.025 | 36 | 0.025 | 0 | 0 | 0 | 6.9 | 2.57 |
| CS3 | 0.14 | 1.0 | 2.6 | 0.01 | 0.002 | 0.033 | 0.6 | 23 | 0.025 | 42 | 0.020 | 0 | 0 | 0 | 6.0 | 1.63 |
| CS4 | 0.17 | 0.5 | 3.1 | 0.01 | 0.002 | 0.036 | 0.5 | 19 | 0.02 | 54 | 0.020 | 0 | 0 | 0 | 3.7 | 3.10 |
| CS5 | 0.14 | 1.5 | 2.1 | 0.02 | 0.003 | 0.045 | 1.2 | 22 | 0.03 | 49 | 0.025 | 0 | 0 | 0 | 6.1 | 0.78 |
| CS6 | 0.18 | 1.2 | 2.3 | 0.02 | 0.003 | 0.031 | 1.3 | 26 | 0.025 | 30 | 0.015 | 0 | 0 | 0 | 8.3 | 0.92 |
| CS7 | 0.10 | 1.5 | 2.7 | 0.02 | 0.003 | 0.029 | 1.5 | 17 | 0.02 | 44 | 0.020 | 0 | 0 | 0 | 4.5 | 0.90 |
| CS8 | 0.13 | 1.0 | 2.4 | 0.02 | 0.003 | 0.041 | 0.9 | 22 | 0.02 | 49 | 0.015 | 0 | 0 | 0 | 4.1 | 1.26 |
| CS9 | 0.14 | 0.5 | 2.3 | 0.011 | 0.001 | 0.035 | 1.0 | 20 | 0.025 | 46 | 0.020 | 0 | 0 | 0 | 5.4 | 1.53 |

*IS: Inventive Steel,
**CS: Comparative Steel,
***R: Relationship.

(In Table 1, each of B* and N* refers to an amount in a unit of 'ppm'.)

The comparative steels 3, 4, 8 and 9 in Table 1 above were indicated by the comparative steels in Table 1, since the manufacturing conditions of Table 2 below do not satisfy the present disclosure.

TABLE 2

| Steel | Annealing conditions | | Cooling and maintaining conditions | | | | Pickling conditions | | R6 |
|---|---|---|---|---|---|---|---|---|---|
| | temperature (° C.) | Dew point (° C.) | Rapid cooling rate (° C./min) | Rapid cooling temperature (° C.) | ***R5 | Slow cooling rate (° C./min) | HCl concentration (%) | HCl temperature (° C.) | |
| *IS1 | 820 | −38 | 390 | 450 | 155 | 25 | 5.5 | 60 | 1.11 |
| IS2 | 830 | −38 | 400 | 450 | 168 | 25 | 15 | 75 | 1.36 |
| IS3 | 840 | −39 | 430 | 460 | 124 | 30 | 10 | 65 | 1.33 |

TABLE 2-continued

| | Annealing conditions | | Cooling and maintaining conditions | | | | Pickling conditions | | |
|---|---|---|---|---|---|---|---|---|---|
| Steel | temperature (° C.) | Dew point (° C.) | Rapid cooling rate (° C./min) | Rapid cooling temperature (° C.) | ***R5 | Slow cooling rate (° C./min) | HCl concentration (%) | HCl temperature (° C.) | R6 |
| IS4 | 820 | −40 | 430 | 430 | 197 | 25 | 7 | 60 | 1.38 |
| IS5 | 830 | −44 | 430 | 450 | 169 | 29 | 13 | 75 | 1.16 |
| IS6 | 820 | −43 | 390 | 420 | 213 | 29 | 6.5 | 70 | 1.34 |
| IS7 | 840 | −45 | 380 | 410 | 260 | 26 | 11 | 80 | 1.30 |
| IS8 | 820 | −45 | 390 | 400 | 255 | 25 | 9 | 75 | 1.19 |
| IS9 | 825 | −38 | 420 | 440 | 208 | 30 | 10 | 50 | 1.47 |
| IS10 | 835 | −44 | 390 | 400 | 257 | 30 | 15 | 75 | 1.37 |
| IS11 | 820 | −38 | 430 | 440 | 166 | 21 | 9 | 65 | 1.16 |
| **CS1 | 810 | −43 | 430 | 450 | 164 | 30 | 13 | 75 | 1.18 |
| CS2 | 820 | −35 | 390 | 420 | 165 | 34 | 8 | 65 | 1.62 |
| CS3 | 800 | −44 | 380 | 360 | <u>443</u> | 25 | 15 | 70 | 1.29 |
| CS4 | 840 | −40 | 350 | 350 | <u>509</u> | 30 | 10 | 65 | 1.22 |
| CS5 | 840 | −45 | 350 | 420 | 248 | 30 | 17 | 80 | 1.13 |
| CS6 | 840 | −39 | 380 | 380 | <u>420</u> | 30 | 15 | 75 | 1.12 |
| CS7 | 820 | −38 | 380 | 400 | <u>361</u> | 28 | 15 | 60 | <u>0.69</u> |
| CS8 | 830 | −43 | 380 | 450 | 159 | 30 | 10 | 70 | <u>0.85</u> |
| CS9 | 820 | −38 | 400 | 440 | 196 | 35 | 5 | 50 | <u>0.49</u> |

*IS: Inventive Steel,
**CS: Comparative Steel,
***R: Relationship.

(In Inventive steels 1 to 11 and Comparative steels 1 to 9 in Table 2, the rapid cooling temperature satisfies the range of Ms to Bs.)

TABLE 3

| | GDS component analysis (wt %) | | | | | Chemical conversion |
|---|---|---|---|---|---|---|
| Examples | ***R2 | Mn* | Si* | Cr* | R3 | treatability |
| *IE1 | 3.25 | 2.3 | 0.2 | 1.1 | 1.77 | ○ |
| IE2 | 1.15 | 2.0 | 1.4 | 1.2 | 0.77 | ○ |
| IE3 | 1.92 | 1.8 | 0.9 | 1.0 | 0.95 | ○ |
| IE4 | 3.38 | 2.5 | 0.2 | 0.9 | 2.27 | ○ |
| IE5 | 1.20 | 2.1 | 1.5 | 1.2 | 0.78 | ○ |
| IE6 | 3.25 | 2.2 | 0.4 | 0.9 | 1.69 | ○ |
| IE7 | 1.29 | 2.0 | 1.1 | 1.1 | 0.91 | ○ |
| IE8 | 2.90 | 2.6 | 0.8 | 0.5 | 2.00 | ○ |
| IE9 | 1.62 | 1.8 | 0.3 | 1.4 | 1.06 | ○ |
| IE10 | 1.87 | 2.4 | 1.3 | 0.7 | 1.20 | ○ |
| IE11 | 2.08 | 2.2 | 0.8 | 1.0 | 1.22 | ○ |
| **CE1 | 1.15 | 1.9 | 1.5 | 1.2 | 0.70 | ○ |
| CE2 | 2.57 | 1.6 | 0.6 | 0.6 | 1.33 | ○ |
| CE3 | 1.63 | 2.4 | 1.4 | 0.8 | 1.09 | ○ |
| CE4 | 3.10 | 2.8 | 0.8 | 0.7 | 1.87 | ○ |
| CE5 | 0.78 | 1.8 | 2.1 | 1.6 | 0.49 | x |
| CE6 | 0.92 | 2.1 | 1.6 | 1.7 | 0.64 | x |
| CE7 | 0.90 | 2.3 | 2.2 | 1.9 | 0.56 | x |
| CE8 | 1.26 | 1.8 | 2.2 | 1.7 | 0.46 | x |
| CE9 | 1.53 | 1.7 | 1.0 | 1.9 | 0.59 | x |

*IE: Inventive Example,
**CE: Comparative Example,
***R: Relationship.

(In Table 3, Mn*, Si* and Cr* mean the average value of GDS component analysis values from the surface to 0.1 μm, respectively.)

TABLE 4

| | Microstructure fractions | | | | Mechanical properties | | | | Property |
|---|---|---|---|---|---|---|---|---|---|
| Examples | B (%) | M (%) | F (%) | γ (%) | YS (MPa) | TS (MPa) | El (%) | R/t | Relationship |
| *IE1 | 64 | 25 | 10 | 1 | 928 | 1245 | 9.6 | 1.7 | 7031 |
| IE2 | 48 | 26 | 22 | 4 | 847 | 1239 | 12.6 | 1.7 | 9183 |
| IE3 | 69 | 23 | 7 | 1 | 783 | 1033 | 14 | 1.3 | 11125 |
| IE4 | 59 | 20 | 21 | 0 | 812 | 1093 | 12 | 1.3 | 10089 |
| IE5 | 48 | 27 | 23 | 2 | 763 | 1088 | 13 | 1.7 | 8320 |
| IE6 | 57 | 25 | 16 | 2 | 1013 | 1379 | 8.9 | 2.1 | 5844 |
| IE7 | 54 | 32 | 12 | 2 | 993 | 1399 | 8.8 | 2.1 | 5862 |
| IE8 | 61 | 23 | 13 | 3 | 968 | 1295 | 11.2 | 2.0 | 7252 |
| IE9 | 50 | 26 | 23 | 1 | 894 | 1256 | 11 | 2.5 | 5526 |
| IE10 | 66 | 20 | 10 | 4 | 991 | 1319 | 11.7 | 2.1 | 7349 |
| IE11 | 64 | 21 | 12 | 3 | 1029 | 1344 | 11.6 | 2.1 | 7424 |
| **CE1 | 52 | 13 | 35 | 0 | 652 | 940 | 14.6 | 1.3 | 10557 |
| CE2 | 62 | 11 | 26 | 1 | 699 | 953 | 13.4 | 1.7 | 7512 |
| CE3 | 26 | 39 | 33 | 2 | 942 | 1365 | 7.9 | 2.9 | 3718 |
| CE4 | 19 | 72 | 8 | 1 | 1042 | 1509 | 7.1 | 4.2 | 2551 |
| CE5 | 49 | 19 | 28 | 4 | 905 | 1211 | 12.6 | 2.9 | 5262 |

TABLE 4-continued

| | Microstructure fractions | | | | Mechanical properties | | | | Property |
|---|---|---|---|---|---|---|---|---|---|
| | | | | | YS | TS | El | | |
| Examples | B (%) | M (%) | F (%) | γ (%) | (MPa) | (MPa) | (%) | R/t | Relationship |
| CE6 | 27 | 59 | 11 | 3 | 1086 | 1469 | 8.3 | 4.2 | 2903 |
| CE7 | 28 | 53 | 16 | 3 | 856 | 1182 | 9.1 | 2.5 | 4302 |
| CE8 | 46 | 34 | 17 | 3 | 883 | 1251 | 12.1 | 1.7 | 8904 |
| CE9 | 62 | 21 | 14 | 3 | 1012 | 1356 | 11.4 | 2.1 | 7361 |

*IE: Inventive Example,
**CE: Comparative Example.

(In Table 4, B means bainite, M means martensite, F means ferrite, and y means retained austenite.

In addition, YS denotes yield strength, TS denotes tensile strength, E1 denotes elongation, and R/t denotes bendability, and property Relationship denotes (tensile strength (MPa)× elongation (%))/(R/t).)

As shown in Tables 1 to 4, Examples 1 to 11 satisfying all of the alloy composition and manufacturing conditions proposed in the present disclosure may be confirmed to have excellent phosphatability by satisfying the criteria of chemical conversion treatment.

Further, as the bainite and martensite are formed in an appropriate fraction, in addition to the tensile strength of 1 GPa or greater, and the ductility and bendability are excellent to (tensile strength (MPa)×elongation (%))/(R/t) value of 5500 or greater.

The above results show that the inventive steels according to the present disclosure are excellent in not only phosphatability but also press formability and roll forming formability.

On the other hand, in Comparative Examples 1 to 9, it can be confirmed that the conditions of any one or more of the alloy composition and the manufacturing conditions deviate from the present disclosure, and that all of the desired physical properties in the present disclosure may be not satisfied.

Among them, in Comparative Examples 1 and 2, amounts of C and Mn in the alloy composition did not satisfy the present disclosure, and the target tensile strength of 1 GPa or greater could not be secured.

In Comparative Examples 3 and 4, since the maintaining conditions after rapid cooling in the manufacturing conditions (Relationship 5) did not satisfy the present disclosure, it was impossible to secure bainite phase of a desired fraction, and the tensile strength (MPa)×Elongation (%))/(R/t) value was less than 5500.

In the case of Comparative Example 5, Si was excessively added, Relationship 2 did not satisfy the present disclosure, and the phosphatability was deteriorated.

In Comparative Example 6, since Cr was excessively added, Relationship 2 did not satisfy the present disclosure, and the maintaining condition after the rapid cooling (Relationship 5) did not satisfy the present disclosure, phosphatability and (tensile strength (MPa)×elongation (%))/(R/t) value of less than 5500 were deteriorated.

In Comparative Example 7, both of Si and Cr were excessively added, such that Relationship 2 did not satisfy the present disclosure, and the post-pickling process (Relationship 6) did not satisfy the present disclosure. Further, as the rapid cooling and maintaining (Relationship 5) was deviated, the fraction of bainite was formed to be less than 30% and the mechanical properties were also deteriorated.

In Comparative Examples 8 and 9, the alloying composition satisfied the present disclosure, but the oxides remained on the surface of the steel after the pickling due to the unsatisfactory post-pickling process (Relationship 6), thereby failing to satisfy Relationship 3 of the present disclosure such that the phosphatability was deteriorated.

As described above, only when the alloying composition and manufacturing conditions proposed in the present disclosure, particularly, Relationships 1 to 6 of the present disclosure are satisfied, an ultra-high strength steel sheet having excellent ultra-high strength, excellent bendability, and excellent phosphatability may be manufactured as intended in the present disclosure.

The invention claimed is:

1. An ultra-high strength steel sheet having excellent phosphatability and bendability, the steel sheet comprising, by weight percentage (wt %), carbon (C): 0.08% to 0.2%, silicon (Si): 0.05% to 1.3%, manganese (Mn): 2.0% to 3.0%, phosphorus (P): 0.001% to 0.10%, sulfur (S): 0.010% or less, aluminum (Al): 0.01% to 0.1%, chromium (Cr): 0.3% to 1.2%, boron (B): 0.0010% to 0.0030%, titanium (Ti): 0.01% to 0.05%, nitrogen (N): 0.001% to 0.01%, a remainder of iron (Fe) and other inevitable impurities, wherein Ti and N satisfy Relationship 1:

$$3.4 \leq Ti/N \leq 10 \qquad \text{[Relationship 1]}$$

where Ti and N refer to a weight percentage (wt %) of the elements Ti and N, respectively, wherein Mn, Si and Cr satisfy Relationship 2:

$$1.0 \leq Mn/(Si+Cr) \qquad \text{[Relationship 2]}$$

where Mn, Si and Cr refer to a weight percentage (wt %) of the elements Mn, Si and Cr, respectively, and wherein amounts of Mn, Si and Cr in a surface layer, ranging from a surface to a 0.1 μm position in a thickness direction, satisfy Relationship 3:

$$0.7 \leq Mn^*/(Si^*+Cr^*) \leq Mn/(Si+Cr) \qquad \text{[Relationship 3]}$$

where Mn, Si and Cr refer to a weight percentage (wt %) of the elements Mn, Si and Cr, respectively, and Mn*, Si* and Cr* refer to an average weight percent (wt %) of the elements Mn, Si and Cr in the surface layer, respectively, and obtained by GDS component analysis.

2. The ultra-high strength steel sheet according to claim 1, wherein the steel sheet further comprises, by weight percentage (wt %), one or more of niobium (Nb): 0.01% to 0.05%, molybdenum (Mo): 0.01% to 0.20%, vanadium (V): 0.01% to 0.20%, and tungsten (W): 0.01% to 0.20%, and satisfies Relationship 4:

$$0.01 \leq Nb+0.2(Mo+V+W) \leq 0.05 \qquad \text{[Relationship 4]}$$

where Nb, Mo, V and W refer to a weight percentage (wt %) of the elements Nb, Mo, V and W, respectively.

3. The ultra-high strength steel sheet according to claim 1, wherein the steel sheet has a microstructure comprising, by area fraction, 30% to 80% of bainite, 20% to 50% of martensite, less than 5% of retained austenite, and a remainder of ferrite.

4. The ultra-high strength steel sheet according to claim 1, wherein the steel sheet has (tensile strength (MPa)×elongation (%))/(R/t) value of 5500 or greater where (R/t) refers a bendability, and R refers to a minimum radius of curvature causing no crack when V-bending the steel sheet having a thickness tin millimeters.

5. The ultra-high strength steel sheet according to claim 1, wherein the steel sheet comprises: a cold-rolled steel sheet.

\* \* \* \* \*